(12) United States Patent
Zafferri

(10) Patent No.: US 6,374,010 B1
(45) Date of Patent: Apr. 16, 2002

(54) OPTICAL SWITCH

(75) Inventor: Roberto Zafferri, Knoxville, TN (US)

(73) Assignee: Wellgain Optical Communication Ltd., Kowloon (HK)

( * ) Notice: Subject to any disclaimer, the term of this patent is extended or adjusted under 35 U.S.C. 154(b) by 0 days.

(21) Appl. No.: 09/876,232

(22) Filed: Jun. 8, 2001

(51) Int. Cl.[7] .............................. G02B 6/42
(52) U.S. Cl. ...................................... 385/23
(58) Field of Search ................... 385/23–24, 16, 385/147; 369/13.28, 13.32, 44.22, 13.02, 47.15, 59.1

(56) References Cited

U.S. PATENT DOCUMENTS 6,208,594 B1 * 3/2001 Huber et al. ............. 369/13.02
6,219,472 B1 * 4/2001 Horino et al. ............ 359/320
6,226,233 B1 * 5/2001 McDaniel et al. ....... 369/13.28

\* cited by examiner

*Primary Examiner*—Akm E. Ullah
(74) *Attorney, Agent, or Firm*—Leydig, Voit, & Mayer, Ltd.

(57) ABSTRACT

An optical switch for switching a light beam in an optical fiber communication line. The switch includes a hollow body, an optical system supported by a first part of the body for movement to act upon a light beam, and an actuator supported by a second part of the body for moving the optical system between first and second positions, in at least one of which positions the optical system acts upon a light beam. An elastic element is included, which has a first part connected to the actuator and a second part connected to the optical system for movement of the optical system by the actuator.

10 Claims, 4 Drawing Sheets

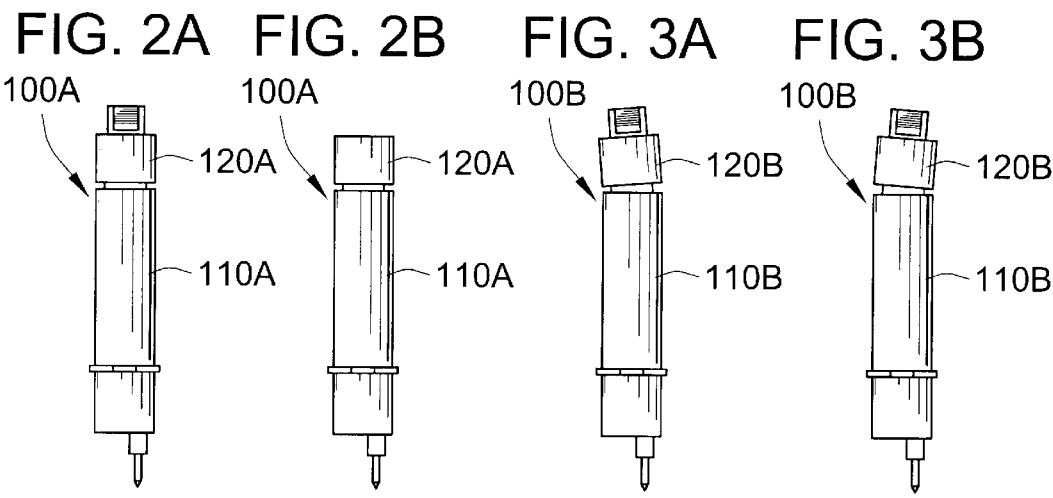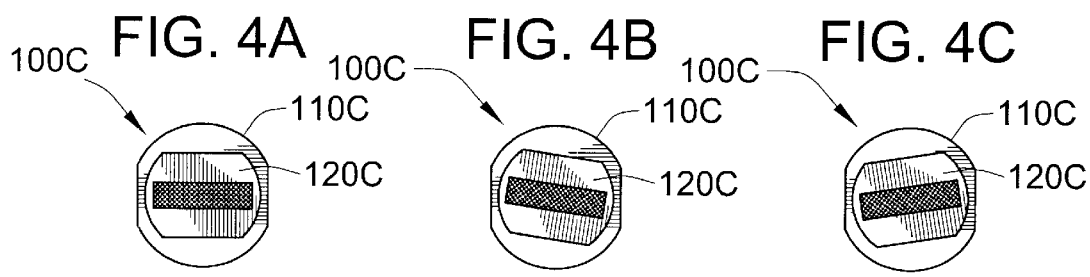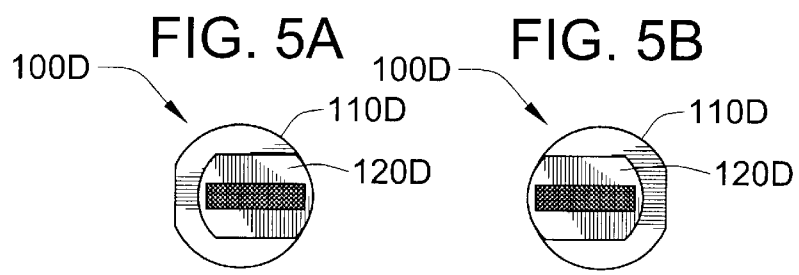

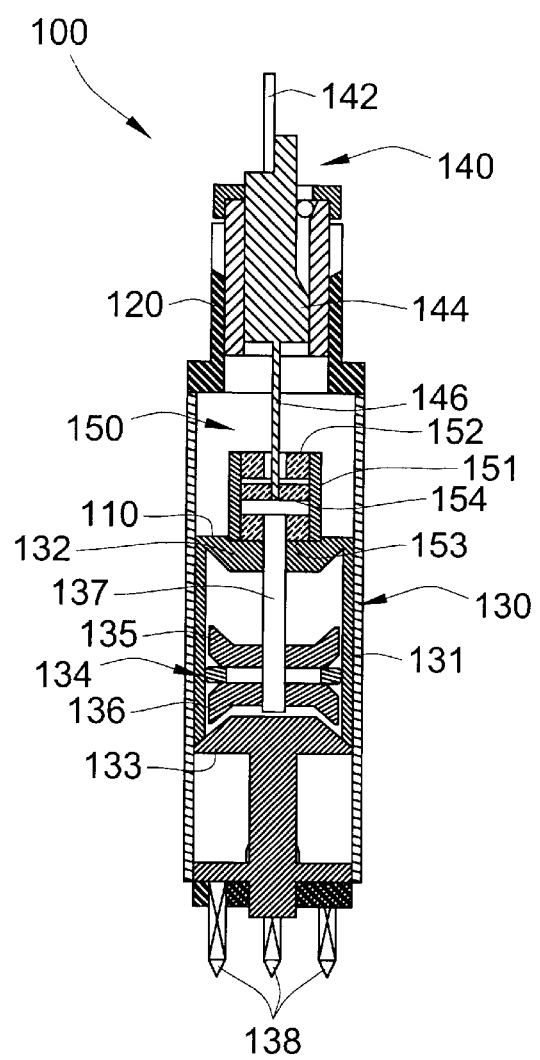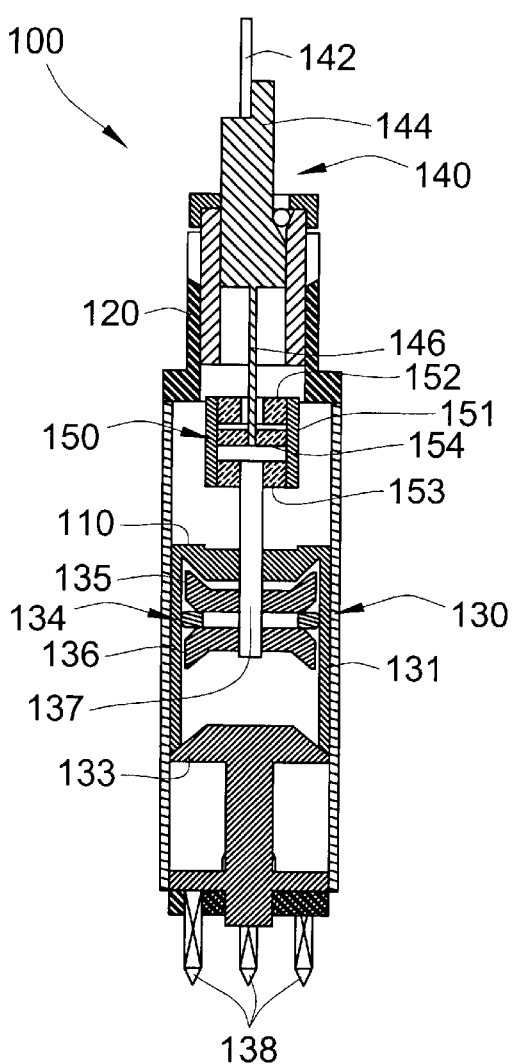

OPTICAL SWITCH

The present invention relates to an optical switch for use in an optical fibre communication system.

BACKGROUND OF THE INVENTION

Optical switches of this type concerned in general have been known, which are used in optical communication systems or lines for switching laser light beams transmitted along the lines. A typical optical switch incorporates an optical system and an actuator connected rigidly to and for moving the optical system.

The combined mass in movement of the actuator, or its moving parts, and the optical system develops inherent shortcomings, such as delay in response speed, prolonged switching times, rebounds and waste of electrical power. Also, mechanical precision of the acutator is critical to achieve precise positioning of the optical system, otherwise loss of light will result. In addition, the actuator and the optical system must be fixed and aligned accurately with each other, which can be enormously difficult within given mechanical constraints and a typical operating temperature range from −40° C. to +80° C.

The invention seeks to mitigate or at least alleviate such shortcomings and problems by providing an improved optical switch.

SUMMARY OF THE INVENTION

According to the invention, there is provided an optical switch for switching a light beam in an optical fibre communication line. The switch comprises a hollow body having first and second parts, an optical system supported by the first part of the body for movement to act upon said light beam, and an actuator supported by the second part of the body for moving the optical system between first and second positions relative to the first body part, in at least one of which positions the optical system is to act upon said light beam. An elastic element is included, which has a first part connected to the actuator and a second part connected to the optical system for enabling the actuator to move the optical system.

In a first preferred embodiment, the elastic element is resiliently deformable in a direction across the optical system and the actuator.

More preferably, the elastic element comprises a magnetic coupler formed by two parts connected to the optical system and the actuator respectively, one of said parts having an equilibrium position relative to the other of said parts defined by magnetic interaction between the two parts.

Further more preferably, one part of the magnetic coupler comprises two opposed magnets and the other part comprises a magnet provided between the two magnets.

It is preferred that the elastic element comprises two parts connected to the optical system and the actuator respectively, said two parts being not in physical contact with each other in a direction across the optical system and the actuator.

It is preferred that the optical system and an actuating member of the actuator are movable in substantially the same direction.

In a second preferred embodiment, the elastic element is resiliently deformable laterally from an axis across the optical system and the actuator.

More preferably, the elastic element comprises a flexible elongate member having opposite ends connected to the optical system and the actuator respectively, said member being bent in compression and arranged to flip over by the actuator to in turn move the optical system.

Further more preferably, the optical system and an actuating member of the actuator are rotatable in opposite directions.

It is preferred that the elastic element comprises a flexible elongate member which has opposite ends connected to the optical system and the actuator respectively and is arranged to toggle upon movement by the actuator and to in turn move the optical system.

BRIEF DESCRIPTION OF DRAWINGS

The invention will now be more particularly described, by way of example only, with reference to the accompanying drawings, in which:

FIGS. 2A and 2B are side views of a second embodiment of an optical switch in accordance with the invention, said switch comprising an actuator and an optical system movable by the actuator between extended and retracted positions;

FIGS. 3A and 3B are side views of a third embodiment of an optical switch in accordance with the invention, said switch comprising an actuator and an optical system rotatable by the actuator between left-skewed and right-skewed positions;

FIGS. 4A and 4B are top plan views of a fourth embodiment of an optical switch in accordance with the invention, said switch comprising an actuator and an optical system rotatable by the actuator between left-turned and right-turned positions;

FIGS. 5A and 5B are top plan views of a fifth embodiment of an optical switch in accordance with the invention, said switch comprising an actuator and an optical system slidable by the actuator between left and right positions;

FIGS. 6A and 6B are cross-sectional side views of the optical switch of FIGS. 1A and 1B, said switch comprising an actuator and an optical system movable by the actuator between relatively retracted and relatively extended positions.

DETAILED DESCRIPTION OF PREFERRED EMBODIMENT

Figure 1A:
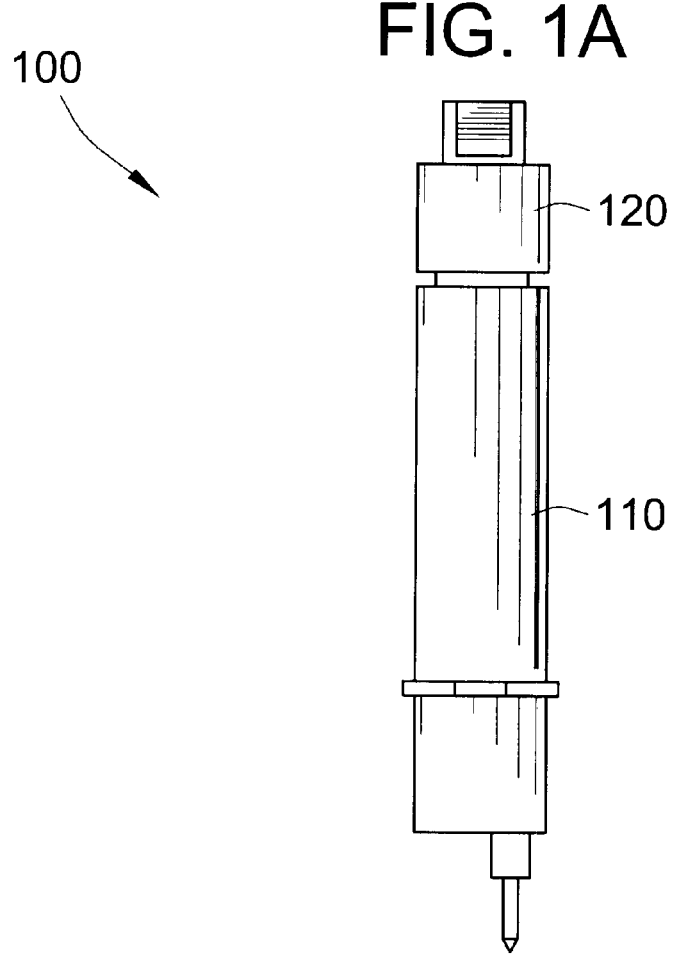
FIGS. 1A and 1B are side and top plan views of a first embodiment of an optical switch in accordance with the invention.
Figure 1B:
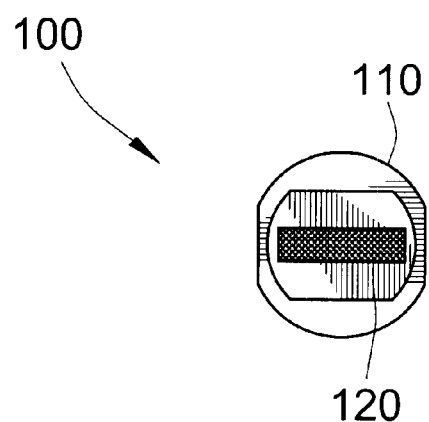

Referring initially to FIGS. 1A and 1B of the drawings, there is shown a first optical switch 100 embodying the invention for use in an optical fibre communication system to switch a laser light beam. The switch 100 has a body formed by generally cylindrical upper principal and lower subsidiary casings 110 and 120 fixed co-axially together. The principal casing 110 houses an actuator (as hereinafter described in detail) that may be implemented by an electromechanical, electromagnetic, capacity, electrostatic or piezoelectric system. The subsidiary casing 120 supports an optical system (as hereinafter described in detail) which may comprise a mirror, prism or filter for action upon the laser beam. Within the casings 110 and 120, the optical system is connected to the actuator by means of an elastic element (as hereinafter described in detail) for movement by the actuator to control or regulate its position relative to the path of the laser beam.

The optical switch 100 is designed for use at a certain intermediate position of an optical fibre communication line, along which a laser beam is to travel from one location to another, for switching the light beam. As a first example, there may be more than one destination for the laser beam, in which case the optical switch 100 incorporates a mirror or prism (as the aforesaid optical system) for changing the travelling direction of the laser beam from one destination to another. As a second example, it may be necessary to alter the characteristics of the laser beam, such as its intensity or colour components, in which case the optical switch 100 incorporates a filter (as the aforesaid optical system) for that purpose.

The actuator serves to move the optical system in a high precision and swift manner for operation between, normally, two alternative positions.

FIGS. 2A and 2B show a second optical switch 100A embodying the invention, which has a general construction similar to that of the first optical switch 100, with equivalent parts designated by the same reference numerals prefixed by a letter "A". In this optical switch 100A, the optical system comprises a mirror which is movable by the actuator in the principal casing 110A between fully extended and fully retracted positions relative to the subsidiary casing 120A.

FIGS. 3A and 3B show a third optical switch 100B embodying the invention, which has a general construction similar to that of the first optical switch 100, with equivalent parts designated by the same reference numerals prefixed by a letter "B". In this optical switch 100B, the optical system comprises a mirror which is rotatable by the actuator in the principal casing 110B between left-skewed and right-skewed positions relative to the subsidiary casing 120B.

FIGS. 4A to 4C show a fourth optical switch 100C embodying the invention, which has a general construction similar to that of the first optical switch 100, with equivalent parts designated by the same reference numerals prefixed by a letter "C". In this optical switch 100C, the optical system comprises a mirror which is rotatable by the actuator in the principal casing 110C between left-turned and right-turned positions relative to the subsidiary casing 120C.

FIGS. 5A and 5B show a fifth optical switch 100D embodying the invention, which has a general construction similar to that of the first optical switch 100, with equivalent parts designated by the same reference numerals prefixed by a letter "D". In this optical switch 100D, the optical system comprises a mirror which is slidable by the actuator in the principal casing 110D between left and right positions relative to the subsidiary casing 120D.

Reference is now made to FIGS. 6A and 6B, which show the detailed construction of the first optical switch 100. An actuator 130 fixed in the principal casing 100 comprises a stationary hollow electromagnetic cylinder 131 and a permanent magnet piston 134 which is slidable co-axially within the cylinder 131. The cylinder 131 has upper and lower end walls 132 and 133 made of soft iron. The piston 134 is formed by upper and lower discs 135 and 136 which present the same poles, such as north poles, on their opposite outer sides. The piston 134 has a central shaft 137 that extends upwards out of the cylinder 131 through a central hole in the upper end wall 132 thereof.

Three electrical terminals 138 are provided at the lower end of the principal casing 110, which are electrically connected to the cylinder 131 for receiving a reversible electrical current to change the polarity of the opposite end walls 132 and 133 of the cylinder 131.

In one direction of the electrical current, the upper end wall 132 is magnetised to be a north pole and the lower end wall 133 a south pole, thereby causing the piston 134 to slide downwards towards and against the lower end wall 133 by reason of magnetic interaction (FIG. 6A). In the reversed direction of the electrical current, the upper end wall 132 is magnetised to be a south pole and the lower end wall 133 a north pole, thereby causing the piston 134 to slide upwards towards and against the upper end wall 132 by reason of magnetic interaction (FIG. 6B).

An optical system 140 supported by the subsidiary casing 120 comprises an external mirror 142 and a base 144 which locates the mirror 142 and is slidable co-axially within the casing 120. The base 144 has a central shaft 146 which extends downwards and is connected endwise to the shaft 137 of the piston 134 by means of an elastic element in the form of a magnetic coupler 150. The magnetic coupler 150 is formed by a vertical non-magnetic open-ended cylinder 151, a pair of upper and lower permanent magnet discs 152 and 153 fixed to extend across opposite ends of the cylinder 151, and an intermediate permanent magnet disc 154 provided between upper and lower discs 152 and 153. The upper and lower discs 152 and 153 are magnetised axially in the same direction such that their confronting sides are in opposite polarities. The intermediate disc 154 is magnetised axially in the reversed directions such that it floats at an equilibrium position through magnetic interaction between the upper and the lower discs 152 and 153. The arrangement is such that the intermediate disc 154 stays out of physical contact with either the upper or the lower disc 152/153.

The shafts 137 and 146 of the actuator 130 and optical system 140 are connected co-axially to the lower and intermediate discs 153 and 154 of the magnetic coupler 150 respectively from below and above. Through interconnection by the magnetic coupler 150, the mirror 142 of the optical system 140 is movable by the actuator 130 between a relatively retracted position as shown in FIG. 6A and a relatively extended position as shown in FIG. 6B.

An elastic joint is formed between the actuator 130 and the optical system 140, which is resiliently deformable in a direction co-axial with that of the actuator 130 and optical system 140. The joint allows a limited degree of freedom of relative movement between the two inter-connected systems 130 and 140 both axially and laterally. The advantages are several fold.

Slight mis-alignment between the actuator 130 and the optical system 140 is tolerable. The optical system 140 is immune from inevitable vibrations and rebounds of the actuator 130 at the end of its movement, with the magnetic coupler 150 acting as a buffer. As the optical system 140 is not rigidly connected to the actuator 130, it does not start moving precisely at the same instant as the piston 134 and shaft 137 of the actuator 130, whereby the mass at the start of initial movement is minimised and that helps to improve the response speed. Switching time can also be improved because the optical system 140 only moves under its own weight.

Referring finally to FIGS. 7 and 7A to 7C of the drawings, there is shown a sixth optical switch 200 embodying the invention, which switch 200 has a hollow cylindrical body having upper and lower parts 220 and 210. The lower body part 210 houses an electromagnetic actuator 230, and the upper body part 220 supports an optical system 240. The optical system 240 includes a mirror 242 supported for rotation by the actuator 230 by means of an elastic element in the form of a relatively stiff yet flexible, bent synthetic wire 250 (or cable or band).

The actuator 230 comprises a stationary electromagnet 231 which is formed by a soft iron core 232 having an arcuate upper end face 233 and a winding 234 on the core 232, and a semi-circular permanent magnet rotor 236. The rotor 236 has a flat front side 237 confronting the core end face 233 and a curved rear side 238 to which the lower end of the wire 250 is connected. Opposite ends of the rotor front side 237 are made as separate north and south poles for magnetic interaction with the core end face 233. The rotor 236 is rotatable between left-inclined and right-inclined positions relative to the core end face 233 (FIGS. 7A and 7C), depending on the polarity at which the electromagnet 231 is energised.

The optical system 240 includes a frame 244 which locates the mirror 242 and is hinged for pivotal movement about a transverse axis of the upper body part 220. The wire 250 is connected at its upper end to the frame 244 at a position adjacent hinge position of the frame 244, for pivoting the frame 244 and hence the mirror 242 upon said rotation of the rotor 236.

Figure 7:
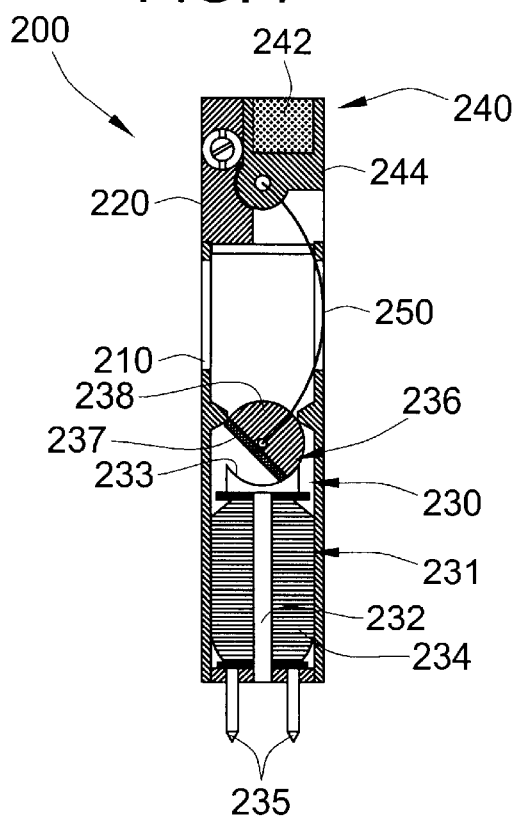
FIGS. 7 and 7A to 7C are cross-sectional side views of a sixth embodiment of an optical switch in accordance with the invention, said switch comprising an actuator and an optical system rotatable by the actuator between retracted and extended positions.
Figure 7A:
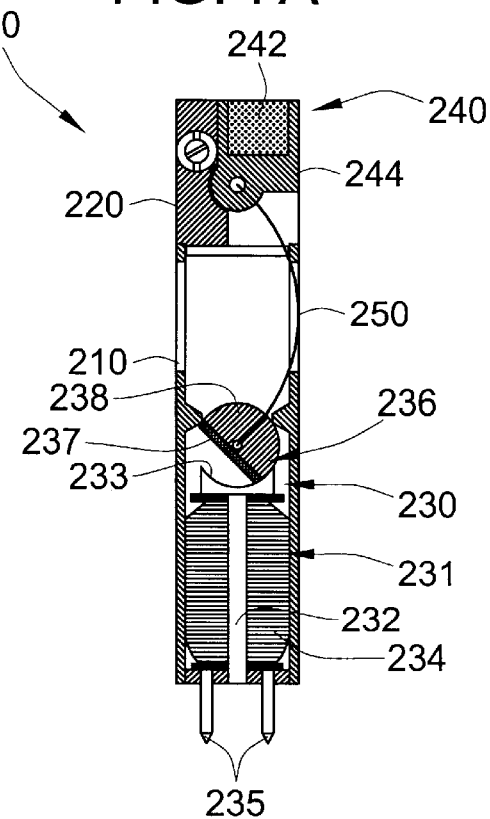
Figure 7B:
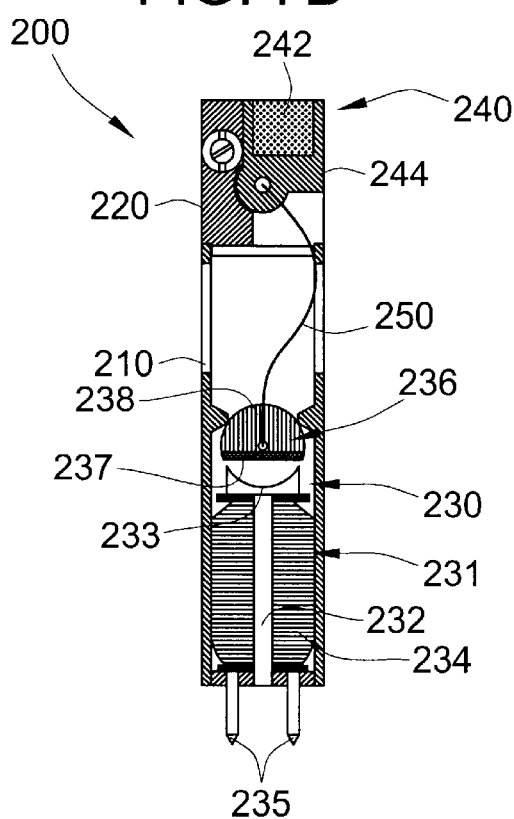
Figure 7C:
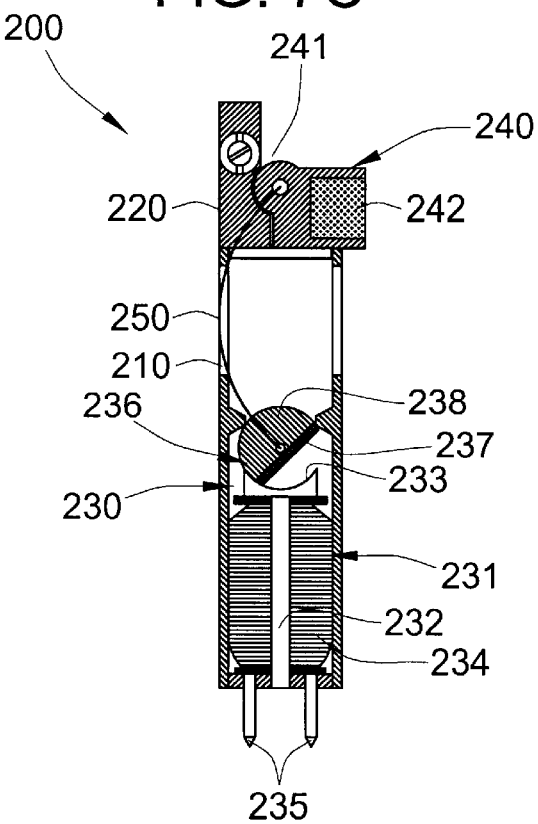

The mirror 242 is pivotable between an upright position in which it is exposed through an aperture 241 of the upper body part 220 (FIG. 7A) and a side-down position off the aperture 241 (FIG. 7C). The aperture 241 is located in the path of a laser beam such that when the mirror 242 is in the upright position, it intercepts with the beam and reflects it into a different direction.

Two electrical terminals 235 are provided at the lower end of the lower body part 210, which are connected to the winding 234 for receiving a reversible electrical current to change the polarity of the end face 233 of the core 232. Upon reversal of the electrical current, the polarity of the core end face 233 is reversed, which causes the rotor 236 to turn swiftly from one to the other of the aforesaid two inclined positions (FIGS. 7A and 7C) past an intermediate position (FIG. 7B).

The wire 250 co-acts between the frame 244 and the rotor 236 such that it will flip over laterally from one side to the opposite side, in a toggling action, when its lower end is pivoted by the rotor 236, thereby rotating the frame 244 and hence the mirror 242, as shown from FIGS. 7A to 7C or vice versa. It should be noted that the rotor 236 and the mirror 242 rotate in opposite directions.

The wire 250 is bent and compressed between the frame 244 and the rotor 236 into a shape that is elastic or resiliently deformable, at least laterally from an axis across the actuator 240 and the optical system 240. The wire 250 will return to or re-assume almost its original shape albeit in the opposite direction, upon release or as manipulated by the rotor 236 turning to the opposite position, and permitted by the frame 244 following to turn.

The optical system 240 and the actuator 230 are not rigidly connected together, but by the wire 250 which is resiliently deformable/flexible and transmits the pivoting force from the actuator 230 to the optical system 240 in an elastic manner that allows a limited degree of freedom of relative movement between the two inter-connected systems 230 and 240.

Mis-alignment between the actuator 230 and the optical system 240 is almost not a concern. The optical system 240 is immune from inevitable vibrations and rebounds of the actuator 230 at the end of its movement, with the wire 250 acting as a buffer. The optical system 240 does not start moving precisely at the same instant as the rotor 236 of the actuator 230, whereby the mass at the start of initial movement is minimised and that helps to improve the response speed. Switching time can also be improved because the optical system 240 only moves under its own weight.

The invention has been given by way of example only, and various modifications of and/or alterations to the described embodiments may be made by persons skilled in the art without departing from the scope of the invention as specified in the appended claims.

We claim:

1. An optical switch for switching a light beam in an optical fibre communication line, comprising:
   a hollow body having first and second parts,
   an optical system supported by the first part of the body for movement to act upon a light beam,
   an actuator supported by the second part of the body for moving the optical system between first and second positions relative to the first body part, the optical system, in at least one of the first and second positions, acting on the light beam, and
   an elastic element having a first part connected to the actuator and a second part connected to the optical system for movement of the optical system by the actuator.

2. The optical switch as claimed in claim 1, wherein the elastic element is resiliently deformable in a direction across the optical system and the actuator.

3. The optical switch as claimed in claim 2, wherein the elastic element comprises a magnetic coupler including first and second parts connected to the optical system and the actuator respectively, one of the first and second parts having an equilibrium position relative to the other of the first and second parts defined by magnetic interaction between the first and second parts.

4. The optical switch as claimed in claim 3, wherein the first part of the magnetic coupler comprises two opposed magnets and the second part comprises a third magnet located between the two opposed magnets.

5. The optical switch as claimed in claim 2, wherein the elastic element comprises first and second parts connected to the optical system and the actuator, respectively, said first and second parts being not in physical contact with each other in a direction across the optical system and the actuator.

6. The optical switch as claimed in claim 2, wherein the optical system and an actuating member of the actuator are movable in substantially the same direction.

7. The optical switch as claimed in claim 1, wherein the elastic element is resiliently deformable laterally from an axis across the optical system and the actuator.

8. The optical switch as claimed in claim 7, wherein the elastic element comprises a flexible elongate member having opposite ends connected to the optical system and the actuator, respectively, the member being in compression and toggled from side-to-side by the actuator to move the optical system.

9. The optical switch as claimed in claim 8, wherein the actuator includes an actuating member and the optical system and the actuating member are rotatable in opposite directions.

10. The optical switch as claimed in claim 7, wherein the elastic element comprises a flexible elongate member which has opposite ends connected to the optical system and the actuator, respectively, and toggles, upon movement by the actuator, moving the optical system.

* * * * *